United States Patent
Braun et al.

(10) Patent No.: US 8,275,368 B2
(45) Date of Patent: Sep. 25, 2012

(54) METHOD AND APPARATUS FOR OPERATING A TELECOMMUNICATION PLATFORM

(75) Inventors: Stephan Braun, Grenoble (FR); Serge Moro, Saint Martin d'Uriage (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 1587 days.

(21) Appl. No.: 10/688,979

(22) Filed: Oct. 21, 2003

(65) Prior Publication Data

US 2004/0083180 A1 Apr. 29, 2004

(30) Foreign Application Priority Data

Oct. 22, 2002 (EP) .................................. 02354168

(51) Int. Cl.
*H04W 24/00* (2009.01)
*H04W 72/00* (2009.01)
(52) U.S. Cl. ...................... 455/423; 455/452.1; 455/453
(58) Field of Classification Search .............. 455/67.11, 455/59, 423–425, 418–420, 450–451, 452.1–452.2, 455/453; 705/59; 370/338, 329, 328
See application file for complete search history.

(56) References Cited

U.S. PATENT DOCUMENTS

| | | | | |
|---|---|---|---|---|
| 5,732,041 A | * | 3/1998 | Joffe ........................ | 365/230.05 |
| 5,752,041 A | * | 5/1998 | Fosdick ........................ | 717/178 |
| 5,758,068 A | * | 5/1998 | Brandt et al. .................... | 726/27 |
| 5,940,504 A | * | 8/1999 | Griswold ........................ | 705/59 |
| 6,662,284 B2 | * | 12/2003 | Gold ............................. | 711/163 |
| 6,732,181 B2 | * | 5/2004 | Lim et al. ...................... | 709/229 |
| 2001/0011253 A1 | * | 8/2001 | Coley et al. ...................... | 705/59 |
| 2001/0037403 A1 | * | 11/2001 | Mougi et al. .................. | 709/238 |
| 2002/0116589 A1 | * | 8/2002 | Gold ............................. | 711/163 |
| 2002/0120624 A1 | | 8/2002 | Givoly et al. | |
| 2002/0161718 A1 | * | 10/2002 | Coley et al. ...................... | 705/59 |
| 2002/0188704 A1 | * | 12/2002 | Gold et al. ..................... | 709/221 |
| 2003/0032406 A1 | * | 2/2003 | Minear et al. .................. | 455/410 |
| 2003/0163712 A1 | * | 8/2003 | LaMothe et al. .............. | 713/189 |
| 2004/0010471 A1 | * | 1/2004 | Lenard et al. ................... | 705/59 |
| 2004/0054909 A1 | * | 3/2004 | Serkowski et al. ........... | 713/176 |

FOREIGN PATENT DOCUMENTS

| | | |
|---|---|---|
| EP | 1178384 A | 2/2002 |
| EP | 1180738 A2 | 2/2002 |
| GB | 2311439 A | 9/1997 |

OTHER PUBLICATIONS

European Search Report.

* cited by examiner

*Primary Examiner* — Brandon Miller

(57) ABSTRACT

According to one aspect of the present invention, there is provided a telecommunications platform having a plurality of communications links of which only a portion of the links are enabled for use through the activation of a first base license key, comprising: a licensing framework for activating an upgrade license key to enable additional ones of the plurality of links; and a traffic monitoring element for measuring the traffic level of the platform and for generating data related to the measured traffic level when it is determined that the measured traffic level is indicative that the number of links used is greater than that provided for by the base license key.

18 Claims, 3 Drawing Sheets

METHOD AND APPARATUS FOR OPERATING A TELECOMMUNICATION PLATFORM

The present invention relates to telecommunications platforms and, more particularly, to ways in which such systems may be operated.

When purchasing telecommunications equipment in the past, customers have had to purchase systems capable of providing sufficient capacity to meet at least their current maximum expected capacity requirements. Failure to do so can result in a telecommunications system being unable to cope with peak demand, which can lead to network overload and the resulting problems associated therewith.

To ensure that the maximum peak demand is within the capacity of a given system it is sensible for considerable over-capacity to be included in a system. Whilst this helps to ensure that the maximum peak demand is within the capabilities of a system it is often the case that, for large amounts of time, the system is underutilized. Given the expense involved in purchasing telecommunication systems customers are generally reluctant to have excessive amounts of equipment sitting idle.

For traditional telephone operators the average daily usage levels and peak levels are typically fairly constant and reasonably predictable, for instance with peak traffic levels generally occurring during normal business hours and lower usage levels generally occurring outside of these times. However, as telephone operators introduce increasing numbers of telephone-based services so these services can lead to traffic levels which do not necessarily follow the traditional model.

One example of such a service is telephone voting in conjunction with popular television programs. Such services can lead to a huge surge in network demand, especially when a high proportion of the television viewers participate. Although the usage levels in conjunction with such services is generally predictable, the traffic levels generated may substantially exceed the 'usual' peak traffic levels experienced by the telephone operators. Accordingly, if a telephone operator wishes to provide such services it is essential that their telecommunications platforms are able to handle the maximum traffic levels likely to be experienced. One of the main problems is that since such telephone services may be used only infrequently, this can lead to a significant amount of expensive spare capacity sitting idle during 'normal' usage. Additionally, the customer may be faced with a high up-front cost even though the popularity of such additional services may be unproven.

So-called pay-per-use systems are known, for example, in the field of multiprocessor supercomputers, such as the Hewlett-Packard SuperDome range of computer servers. Such systems generally have a number of active CPUs which are available for use in processing, and a number of 'available for activation' (AFA) CPUs. Typically the customer leases the computer server and CPUs. The AFA processors may be activated by the customer at will, and the activation triggers automatic tracking of the number of CPUs activated by the supplier for billing purposes. However, such systems are not readily adaptable for use in other domains.

Accordingly, one aim of the present invention is to overcome at least some of the above-mentioned problems.

According to a first aspect of the present invention there is provided a telecommunications platform having a plurality of communications links of which only a portion of the links are enabled for use through the activation of a base license key. The platform comprises a licensing framework for activating an upgrade license key to enable additional ones of the plurality of links and a traffic monitoring element for measuring the traffic level of the platform and for generating data related to the measured traffic level when it is determined that the measured traffic level is indicative that the number of links used is greater than that provided for by the base license key.

Advantageously, this enables such platforms to be acquired at a lower up-front cost by enabling communication links to be purchased independently of any license required to use the links. Should use of additional links be required at a later data, an upgrade license can be obtained to enable the platform to work with the required number of links. The benefits of such a system are numerous. For example, from a customer point of view the financial risk when deploying new services can be lowered since the initial platform costs are lowered and any use made of additional capacity may be charged for on a per-use basis.

Preferably the traffic monitoring element is enabled for use by the licensing framework upon the activation of an upgrade license key.

The upgrade license key may have a time-limited validity period, in which case the platform may further comprise a license enforcement element for deactivating the plurality of links enabled by the activation of the upgrade license key upon the expiry of the validity period.

The license enforcement element may be arranged to progressively deactivate the plurality of links over a predefinable time period. Alternatively, the license enforcement element may be arranged to deactivate all of the plurality of links immediately upon expiry of the validity period.

The license enforcement element may also be adapted to deactivate use of the traffic monitoring element upon expiry of the validity period.

Preferably the telecommunications platform is a replicated telecommunications platform connected in a high availability arrangement through a high-availability framework According to a second aspect of the present invention there is provided a method of operating a telecommunications platform having a plurality of communications links of which only a portion of the links are enabled for use through the activation of a base license key. The method comprises activating an upgrade license key to enable additional ones of the plurality of links, measuring the traffic level of the platform; and generating data related to the measured traffic level for determining whether the number of links used is greater than that provided for by the base license key.

Preferably the step of measuring is adapted to commence measuring the traffic level in response to the activation of the upgrade license key.

The upgrade license key may have a time-limited validity, in which case the method may further comprise deactivating the plurality of links enabled by the activation of the upgrade license key upon the expiry of the validity period.

The step of deactivating the links may be arranged to progressively deactivate the plurality of links over a predefinable time period. The step of deactivating the links may also be arranged to immediately deactivate all of the links upon expiry of the validity period.

The step of deactivating may further comprise suspending the monitoring of the traffic levels upon expiry of the validity period.

The method is preferably adapted for use with a telecommunications platform replicated through a high-availability framework.

In yet a further aspect of the present invention, there is provided a telecommunications platform having a plurality of communications links of which only a portion of the links are enabled for use through the activation of a base license key.

The platform comprises a licensing framework for activating an upgrade license key to temporarily enable additional ones of the plurality of links.

In a still further aspect of the present invention, there is provided a telecommunications platform having a plurality of available communications links of which only a portion of the links are enabled for use with the platform through the activation of a base license key. The platform comprises a licensing framework for activating an upgrade license key to enable additional ones of the plurality of links, a traffic monitoring element for measuring, in response to the activation of the upgrade license key, the traffic level of the platform and for generating data related to the measured traffic level for determining whether the number of links used is greater than that provided for by the base license key.

In a yet still further embodiment, there is provided a telecommunications platform having a plurality of communications links of which only a first portion of the links are enabled for use. The platform comprises a licensing framework for activating an upgrade license key to enable additional ones of the plurality of links, and a traffic monitoring element for measuring the traffic level of the platform and for generating data related to the measured traffic level for determining whether the number of links used exceeds the number in the first portion.

An embodiment will now be described, by way of no limiting example only, with reference to the accompanying drawings, in which:

FIG. 1 is a block diagram outlining a telecommunications platform, generally designated 100, according to the prior art. An example of such a telecommunications platform is the Hewlett-Packard OpenCall SS7 platform.

Figure 1:
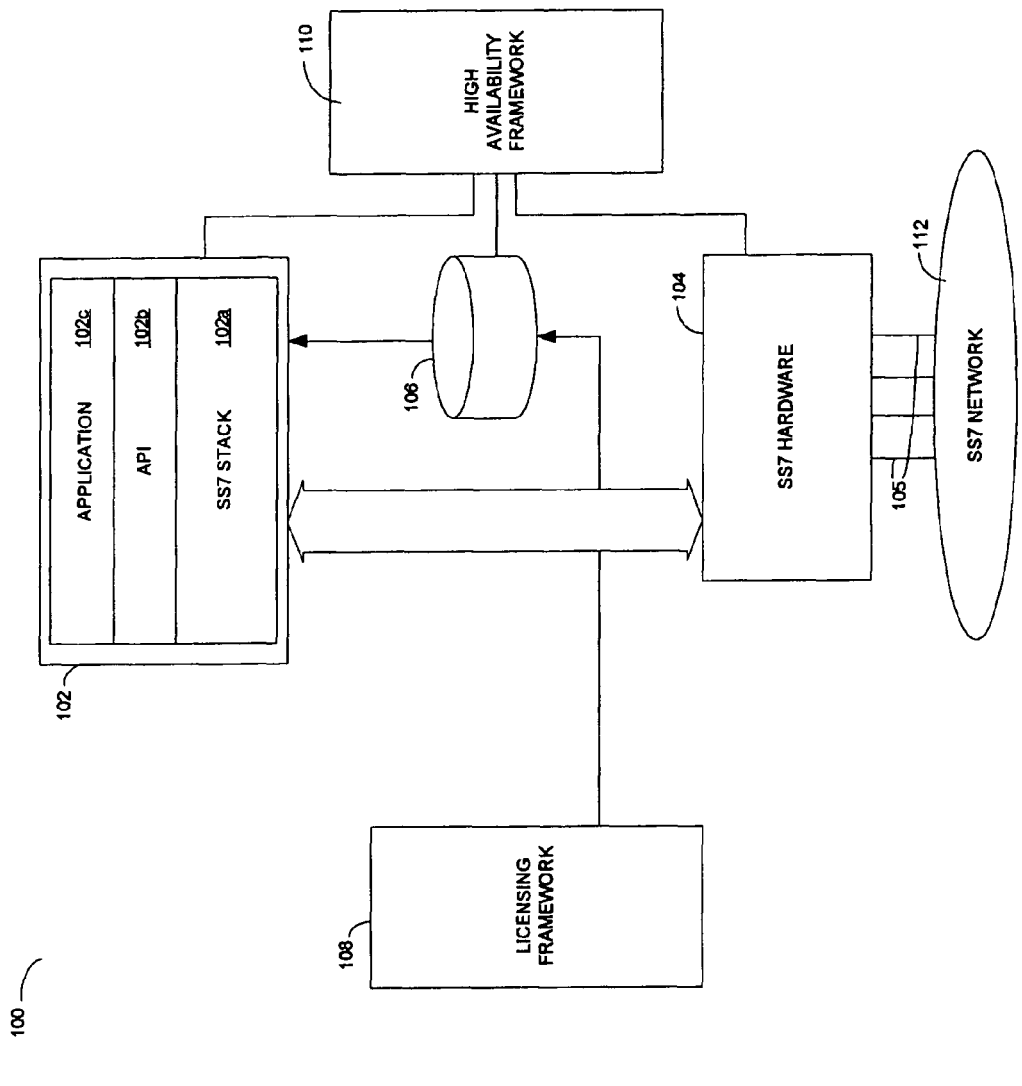
FIG. 1 is a block diagram outlining a telecommunications platform according to the prior art.

The telecommunications platform includes a computer server 102, such as a Hewlett-Packard HP-UX server, on which runs an SS7 stack 102a and a user application 102c. The user application 102c communicates with the SS7 stack 102a via an application programmer interface (API) 102b.

The SS7 stack 102a has access to an SS7 network 112 through numerous SS7 communications links 105 provided by SS7 hardware 104. Each communication link provides a certain amount of traffic capacity and thus the more communication links in a platform, the greater the traffic capacity. The SS7 hardware 104 may take various forms, such as telecommunication signaling cards (TSC) and telecommunications signaling units (TSU). Typically, TSCs are interface cards which are fitted integral to the computer hardware on which the SS7 stack runs whereas TSUs are typically external units. The functionality provided by TSUs and TSCs is generally the same although the number of communications links provided by TSUs and TSCs may vary.

As will be appreciated by those skilled in the art, telecommunications platforms of this type are relatively expensive. The cost is typically made up of the cost of the physical hardware, such as the server 102 and the computer software such as the SS7 stack 102a, with the SS7 hardware 104 (e.g. TSUs and TCUs) being traditionally particularly expensive. In addition to the physical hardware, a license is also typically required to enable and configure the SS7 hardware 104 for use with the platform. Typically licenses are priced according to the number of communications links to be provided by the telecommunications platform 100, with the price increasing, often considerably, as the number of communication links increase.

A database 106 is provided which provides configuration information used for configuring the SS7 stack 102a, part of which contains configuration information and licensing information provided by a licensing framework 108. The database 106 may be implemented as an in-memory replicated database. The licensing framework 108 is used to enable features of the SS7 stack 102a through the use of license keys provided by the platform supplier. These keys may be provided by the supplier upon delivery of the platform, or may be communicated to the customer, for example, as a result of the purchase of additional SS7 hardware. Typically the licenses are one-time licenses which permanently enable the usage of a given number of communication links. Normally the number of communication links enabled by the license is equal to the number of communication links available through the SS7 hardware.

As is typical for such operation critical telecommunications systems, a duplicate and redundant platform may also be provided, for example, in case of failure of one or more of the components of the telecommunications platform 100 or for maintenance purposes. In this case a high availability (HA) framework 110 is used to ensure synchronization and handover to a duplicate platform (not shown) as is well understood in the prior art.

Due to the current rigid purchasing schemes and the typical pricing structures, customers typically purchase telecommunications platforms including the minimum number of communications links required to ensure that the normally expected peak traffic levels are well within the capabilities of the platform. Although this may minimize the initial expense this obviously limits the customers to only using the capacity provided by their current platform. As more and more telecommunication-based services are becoming available, customers are either forced to permanently upgrade their platforms, for example by adding additional SS7 hardware often at considerable expense, or they may be unable or unwilling to offer such services. None of these situations is particularly desirable.

Figure 2:
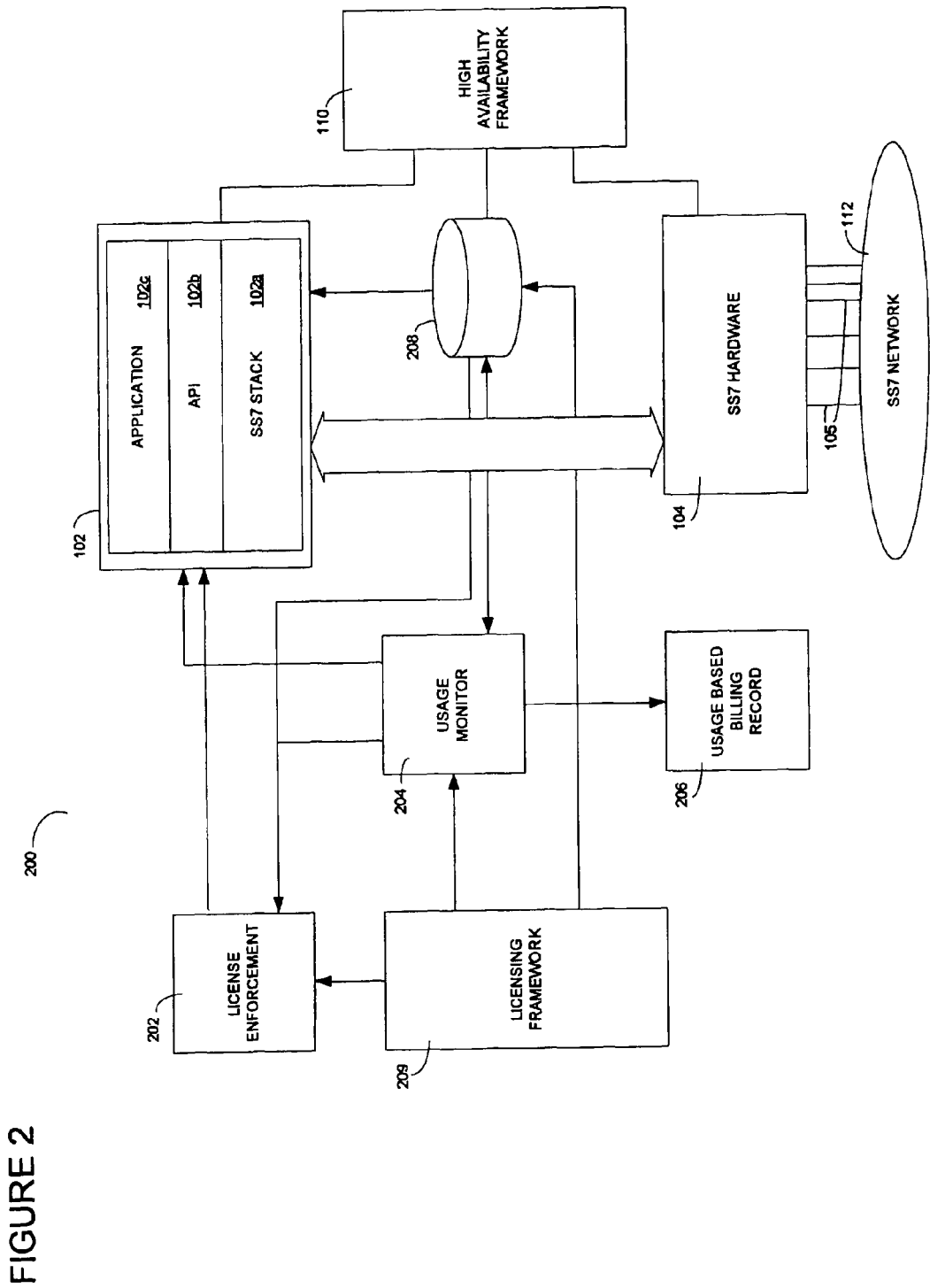
FIG. 2 is a block diagram of a telecommunications platform according to an embodiment of the present invention.

FIG. 2 is a block diagram of a telecommunications platform according to an embodiment of the present invention. The basic functionality provided by the communications platform 200 is similar to that provided by the telecommunications platform 100 or FIG. 1 with like references indicating common elements.

As previously described the total cost of a telecommunications platform of the type described above can generally be split into three distinct areas; the general system hardware (e.g. computer servers, TSUs/TSCs); the system software (e.g. SS7 stack) and a license for enabling the hardware and software to function with the TSUs/TSCs in the system. In the present embodiment the customer purchases a telecommunications platform having more SS7 hardware than is covered by the base license. In this way, the customer may, for example, pay up-front for SS7 hardware capable of providing 256 links but may only purchase a base license enabling 16 of the available communication links. The number of links enabled by the base license key will generally be the number of links required by the customer to ensure that the 'normal' peak traffic level is within the capacity of the platform.

Should additional capacity be required for a temporary period of time, for example because the customer is occasionally employing a telephone voting system in conjunction with a popular television program, a temporary license upgrade may be purchased from the supplier. The temporary license upgrade, which may for example run for a period of, say one year, thereafter allows the customer to exceed the capacity provided by the base license, with the condition that any usage in excess of the capacity provided for by the base license will be charged for based on the actual traffic levels. Upon expiration of the temporary license upgrade the platform is returned to the capacity levels provided for by the base license. Preferably the terms of the temporary license upgrade contractually binds the customer to provide access to usage statistics to the supplier or other third party in order that appropriate billing may take place.

A system implementing the present embodiment will now be described with reference to FIG. 2. In addition to the elements described in relation to FIG. 1, the system of the present embodiment additionally includes a license enforcement element 202 and a traffic usage monitor 204, the purpose of which will be described in greater detail below.

When the platform 200 is initially configured, a base license key is entered into the licensing framework 209. The licensing framework verifies the validity of the base license key to ensure the authenticity of the license key. Those skilled in the art will appreciate that there are many different ways in which such a licensing framework may operate, for example, using digital key signing, encryption and the like. The licensing framework sends configuration data based on the base license key to the database 208. The configuration data is stored in the database 208 and is used during the platform configuration process to enable the number of communication links provided for by the base license. Once the system is configured the telecommunications platform 200 may operate in the normal manner providing traffic capacity up to that provided by the enabled number of communication links 105.

If, for example, the customer decides that capacity greater than that provided by the base license is required a temporary license upgrade may be purchased, for example from the supplier of the platform. The temporary license upgrade preferably takes the form of an upgrade license key. The upgrade license key is activated through the licensing framework 209 which checks the authenticity and validity of the key. The upgrade license key contains upgrade configuration data which provides details of the number of communication links to be enabled, together with a time validity period, both of which may affect the price of the upgrade license key.

If the license key is determined as being authentic and valid then upgrade configuration data relating to the number of communication links to be enabled is stored in the database 208. Together with the configuration data relating to the base license key, this information may be used by the system upon initialization of the platform to ensure that the correct number of communication links are configured and enabled.

Alternatively, the upgrade license key may be activated after the initial configuration, for example, while the platform is up and running. The activation of the license upgrade, which is subjected to a time validity check in addition to the checks performed on the base license key, enables the additional communications links provided for by the license upgrade to be subsequently configured for use with the platform. The enabling of the additional communications links may be carried out, for example, by the license enforcement element 202 through the API 102*b*.

Storing configuration data provided by the upgrade license key in the database 208 ensures that, in the event of a handover being required to the standby system through the high availability framework 110, the standby system will be configured for the correct number of communication links.

The activation of the upgrade license key also enables a usage monitor 204 which monitors the total number of transactions processed by the platform 200. The usage monitor 204 regularly obtain details of the current traffic levels, for example, via the API 102*b* which reports the number of transactions per second being processed by the platform. The usage monitor creates a daily log which forms part of a usage based billing record 206. The usage based billing record is preferably digitally signed to ensure the integrity of the data recorded therein.

The usage monitor also stores the current maximum measured traffic level for the current day in the database 208. This data may be used in the event that the current telecommunications platform fails and use is to be made of the duplicated platform through the high-availability framework 110. In this case, upon handover to the standby system, the current maximum traffic level will be retrieved from the database 208 and used by the duplicated usage monitor to create the billing record. In this way, it is not necessary to store all traffic information for any given day in the database 208, since only the maximum traffic level is used in the billing record 206. It will be appreciated that the high availability framework provides duplication of all of the elements shown in FIG. 2.

The usage monitor 204 may be internal to the SS7 stack 102*a* to further ensure that unauthorized access and tampering is avoidable. Alternatively, the usage monitor 204 may also be an external element, as shown in FIG. 2. One advantage of having an external monitor is that the system according to the present embodiment may be easily retrofitted to existing telecommunications platforms.

The platform supplier may obtain the usage based billing record in a number of different ways, for example, by directly transmitting the record via a communications network or by sending the record via a disk or other convenient storage media. The frequency of which the billing record is sent or made available to the supplier may vary according to particular circumstances. For example, it may preferable to send a billing record once a month containing all the of the daily peak values measured during the month. Preferably the terms of the upgrade license contractually bind the customer to providing access to the billing record.

In order to ensure that any use made of the additional capacity provided for by the upgrade license key is charged for, the platform supplier analyzes the billing record and determines the maximum number of communication links used for any given period. This process is preferably an automated process performed on an electronic version of the billing record. A bill may thus be generated for any usage made of communication links over that provided by the base license key.

Base licenses for communication links are often 'stepped' to take account of the fact that a single TSU or TSC provides typically 4 or 8 communication links. Thus licenses are typically available for any number of communication links (up to the maximum supported by the platform) in multiples of 8. The amount charged to the customer for making use of the extra capacity provided by the upgrade license key may therefore vary depending on the precise agreements between the customer and the platform supplier.

Figure 3:
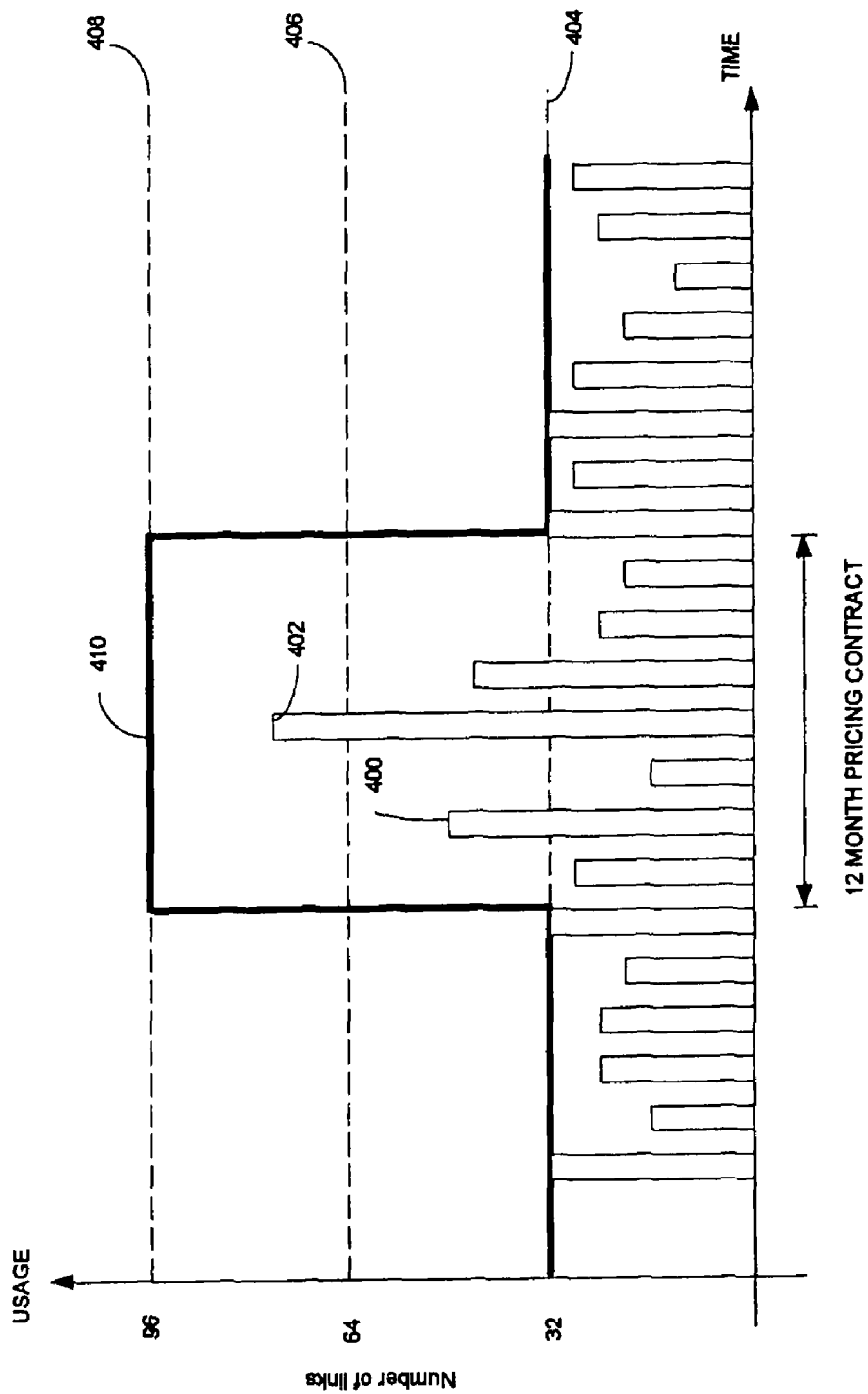
FIG. 3 is a diagram showing a charging scheme according to an embodiment of the present invention.

One way in which the charging can be applied is to apply a charge for each day in which the number of communication links used is greater than that provided for by the base license. An example of this is shown in FIG. 3. The dotted line 404 indicates the capacity provided by the base license of, for example, 32 communication links. The limits of the maximum additional capacity available through the temporary upgrade license are shown as solid line 410. This shows that the temporary license provides up to 96 communication links for a period of one year. Whilst the usage remains within the capacity of that provided by the base license key, no further charges are made to the customer. However, as shown at 400, when the traffic levels use more than that number of links an additional daily charge is applied. In the case of traffic level 400, a daily charge for a temporary upgrade to 64 links is applied. Traffic level 402, however, shows that a daily charge for an upgrade to 96 links is applied.

The license enforcement module 202 performs daily checks to determine whether the temporary license upgrade key has expired or not. If it has expired the enforcement module 202 deactivates, for example through the API 102b, the additional communication links enabled by the temporary license upgrade. The deactivation of the additional communications links may take place in a number of ways. For example, the deactivation can be arranged to gradually deactivate a certain number of communication links every day until the level provided for by the base license key is reached. Alternatively, the deactivation can be arranged to deactivate all additional communication links as soon as the upgrade license key expires.

Once the license has expired, there is no longer any need to provide usage billing records, since only the capacity provided by the base license key will be available. Thus, the usage monitor, along with the license enforcement element may also be disabled.

Those skilled in the art will appreciate that other billing models or pricing schemes could also be used. For example, in some circumstances customers may be unwilling to provide the platform supplier with usage data. Therefore, in a further embodiment the platform charging model may be arranged such that price of the temporary upgrade license key includes the cost of any usage made of communication links enabled by the upgrade license key. In this case, there is no need to monitor the traffic levels or to provide traffic level reports.

It is preferable that any pricing scheme is structured in such a way that it is not attractive for customers looking for a high capacity system with low up-front costs. In other words, the preferred pricing scheme should ensure that daily use made of capacity provided by the temporary license upgrade works out more expensive overall than buying a platform with the appropriate 'normal' use base license. The concepts described above may also be used for existing telecommunications platforms with only minimal modifications being required.

It will be appreciated that the concepts of the present invention are in no way limited to the example embodiments described above.

The invention claimed is:

1. A telecommunications platform having a plurality of communications links, each link providing a certain amount of traffic capacity to a communications network, of which only a portion of the links to the communications network are enabled for use through the activation of a first base license key, comprising:
    a licensing framework for activating an upgrade license key to enable additional ones of the plurality of links to the communications network to increase the total amount of traffic capacity to the communications network; and
    a traffic monitoring element for measuring the traffic level of the platform and for generating data related to the measured traffic level for determining whether the number of links to the communications network which are used is greater than that provided for by the base license key.

2. A telecommunications platform according to claim 1, wherein the traffic monitoring element is enabled for use by the licensing framework upon the activation of the upgrade license key.

3. A telecommunications platform according to claim 1, wherein the upgrade license key has a time-limited validity period, and further comprising a license enforcement element for deactivating the plurality of links enabled by the activation of the upgrade license key upon the expiry of the validity period.

4. A telecommunications platform according to claim 3, wherein the license enforcement element is arranged to progressively deactivate the plurality of links over a predefinable time period.

5. A telecommunications platform according to claim 3, wherein the license enforcement element is arranged to deactivate all of the plurality of links immediately upon expiry of the upgrade license key.

6. A telecommunications platform according to claim 3, wherein the license enforcement element is adapted to deactivate use of the traffic monitoring element upon expiry of the upgrade license key.

7. A telecommunications platform according to claim 1, further comprising a replicated telecommunications platform connected in a high availability arrangement through a high-availability framework.

8. A telecommunications platform according to claim 1, wherein the upgrade license key has a time-limited validity period, and wherein the traffic monitoring element is configured to be enabled, in response to the activation of the upgrade license key, for the duration of the validity period.

9. A method of operating a telecommunications platform having a plurality of communications links, each link providing a certain amount of traffic capacity to a communications network, of which only a portion of the links to the communications network are enabled for use through the activation of a first base license key, comprising:
    activating an upgrade license key to enable additional ones of the plurality of links to the communications network to increase the total amount of traffic capacity to the communications network;
    measuring the traffic level of the platform; and
    generating data related to the measured traffic level for determining whether the number of links to the communications network which are used is greater than that provided for by the base license key.

10. A method according to claim 9, wherein the step of measuring is adapted to commence measuring the traffic level in response to the activation of the upgrade license key.

11. A method according to claim 9, wherein the upgrade license key has a time-limited validity, and further comprising deactivating the plurality of links enabled by the activation of the upgrade license key upon the expiry of the upgrade license key.

12. A method according to claim 11, wherein the step of deactivating the links is arranged to progressively deactivate the plurality of links over a predefinable time period.

13. A method according to claim 11, wherein the step of deactivating the links is arranged to immediately deactivate all of the links upon expiry of the upgrade license key.

14. A method according to claim 11, wherein the step of deactivating further comprises suspending the monitoring of the traffic levels upon expiry of the upgrade license key.

15. A method according to claim 8, further comprising replicating the telecommunications platform through a high-availability framework.

16. A telecommunications platform having a plurality of communications links, each link providing a certain amount of traffic capacity to a communications network, of which only a portion of the links to the communications network are enabled for use through the activation of a first base license key, comprising:
- a licensing framework for activating an upgrade license key to temporarily enable additional ones of the plurality of links to the communications network to increase the total amount of traffic capacity to the communications network.

17. A telecommunications platform having a plurality of available communications links, each link providing a certain amount of traffic capacity to a communications network, of which only a portion of the links to the communications network are enabled for use with the platform through the activation of a first base license key, comprising:
- a licensing framework for activating an upgrade license key to enable additional ones of the plurality of links to the communications network to increase the total amount of traffic capacity to the communications network; and
- a traffic monitoring element for measuring, in response to the activation of the upgrade license key, the traffic level of the platform and for generating data related to the measured traffic level when it is determined that the measured traffic level is indicative that the number of links used is greater than that provided for by the base license key.

18. A telecommunications platform having a plurality of communications links, each link providing a certain amount of traffic capacity to a communications network, of which only a first portion of the links to the communications network are enabled for use, comprising:
- a licensing framework for activating an upgrade license key to enable additional ones of the plurality of links to the communications network to increase the total amount of traffic capacity to the communications network; and
- a traffic monitoring element for measuring the traffic level of the platform and for generating data related to the measured traffic level for determining whether the number of links to the communications network which are used exceeds the number in the first portion.

* * * * *

UNITED STATES PATENT AND TRADEMARK OFFICE
CERTIFICATE OF CORRECTION

PATENT NO. : 8,275,368 B2  Page 1 of 1
APPLICATION NO. : 10/688979
DATED : September 25, 2012
INVENTOR(S) : Stephan Braun et al.

It is certified that error appears in the above-identified patent and that said Letters Patent is hereby corrected as shown below:

In column 8, line 65, in Claim 15, delete "claim 8," and insert -- claim 9, --, therefor.

Signed and Sealed this
Twelfth Day of February, 2013

Teresa Stanek Rea
*Acting Director of the United States Patent and Trademark Office*